J. MILLER.
METHOD OF MAKING TEA AND COFFEE.
No. 176,980. Patented May 2, 1876.
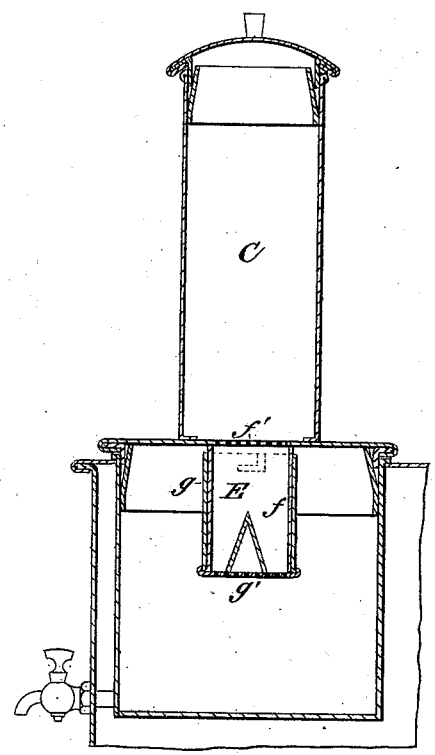
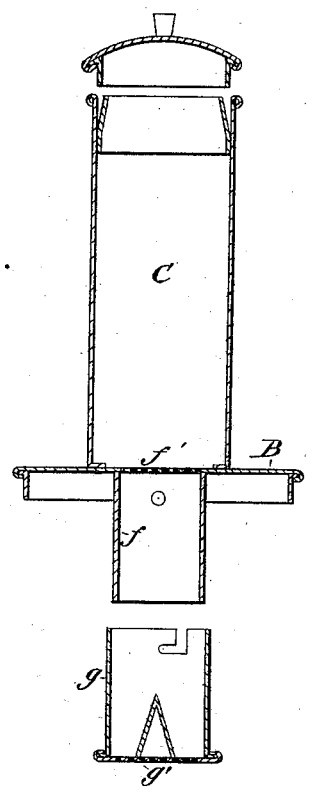

UNITED STATES PATENT OFFICE.

JONATHAN MILLER, OF HIMROD'S, NEW YORK.

IMPROVEMENT IN METHODS OF MAKING TEA AND COFFEE.

Specification forming part of Letters Patent No. 176,980, dated May 2, 1876; application filed March 12, 1873.

*To all whom it may concern:*

Be it known that I, JONATHAN MILLER, of Himrod's, Yates county, in the State of New York, have invented a new and Improved Method of Making Tea and Coffee; and I do hereby declare the following to be a full, clear, and exact description of the same, reference being had to the accompanying drawing, forming a part of this specification, in which—

Figure 1 is a vertical section. Fig. 2 is a vertical section of the water-receptacle and coffee-holder, with the cup of the latter detached.

The object of this invention is to provide a new method of preparing decoctions or infusions of tea, coffee, &c.; and it consists in the method of filling a tight and unyielding chamber full of the ground coffee, or tea, and then passing the hot water through the same, whereby the expansion of the grains consequent upon the absorption of the water produces a considerable pressure, which, in the unyielding chamber, fills up the little interstices or channels between the grains, thereby preventing the fine dust or pulverized portions of the coffee from being washed through, and compelling the water to permeate the pores of the coffee-grains, the said expansion in the filled chamber acting in the nature of a press, so that the bulk of the coffee is held as in a solid mass. The mechanical pressure serves to hold the small particles, which are ordinarily washed through, and the liquid, being made to strain through the pores of the coffee-grains, comes out a perfectly clear and transparent beverage, of a rich wine color, entirely free from sediment and cloudiness.

In carrying out my invention I employ a receptacle, C, for the water, and a holder, E, for the coffee or other material. The said holder is attached to the water-receptacle, and is separated therefrom by a perforated strainer, $f'$. The coffee-holder also has a detachable cup portion, $g$, which has a perforated strainer, $g'$, in its bottom, which said cup portion is made to fit upon the shell $f$ attached to the water-receptacle, and is rigidly fastened to the same by bayonet slots and studs, or other devices, which will not permit the cup to give to the expansion of the coffee. The device, as thus described, is provided with a flange, B, which is designed to rest upon the top of an urn or other suitable receptacle for the coffee, so as to act as the cover to the said urn.

In the ordinary methods of making coffee the ground material is placed loosely in a coffee-chamber, and the hot water poured thereon. Now, the coffee being unconfined and free to expand, it simply increases in bulk, while the little interstices and channels between the grains remain open and act as conduits, down which the water rapidly flows, carrying the fine dust and pulverized portions of the coffee, the result being a decoction which is not sufficiently impregnated with the strength and aroma of the coffee, and which is of a dull opaque color, in consequence of the fine dust and sediment which has washed through the interstices.

By using a tight and unyielding chamber, and filling the same full of the ground material, it will be seen that, as soon as the water commences to pass through, the grains expand, and, as the receptacle cannot yield, the result is the exertion of an expansive force, which, reacting upon the grains, drives them closer together, and shuts up the interstices or channels between the grains.

The advantages arising from this are several in number: The water does not wash down rapidly through the interstices, but moves slowly through the pores of the grains, thoroughly permeating and dissolving the essences and aroma of the coffee. The pressure exerted is such that the bulk of coffee is held as in a single mass, and the particles of dust and sediment are held mechanically from being washed down; and the interstices being closed, and the liquid being compelled to pass through the pores, the bulk of the coffee acts as a clarifying-filter.

It will be remembered that the coffee-holder must be filled full in order to operate upon the above-described principle; and, in order to withstand the pressure incident to the expansion, the strength of the coffee-holder must be relatively increased in proportion to the increased bulk of coffee when larger-sized devices are employed.

Another advantage arising out of the compression of the coffee in the holder is that, when the water is poured in upon the holder, the grains do not, as in ordinary cases, rise to the top of the water and fall back, nor do the vapors of the same condense and fall back, which agitation of the grains and condensation of the vapors have the effect to destroy, in part, the genuine flavor of the coffee.

I am aware of the fact that coffee-pots have been constructed in which the ground coffee has been held down in the holder by a weight; and that an expanding coffee-holder has also been employed to yield to the increased bulk of the coffee when saturated with the water.

In manufacturing coffee by my method, however, the exertion of force requisite to compress the grains and close the interstices is such as to render any avoidable weight or spring wholly impracticable for the purpose, the only way to secure the full benefit of the principle involved being to utilize all of the expansive force, by causing it to react in an unyielding chamber, instead of allowing the coffee-holder to adapt itself to the increased volume of the expanded grains.

I therefore disclaim the cases above referred to, and limit my invention to the terms of the claim.

Having thus described my invention, what I claim as new, and desire to secure by Letters Patent, is—

The herein-described method of making coffee and other decoctions from the ground or loose material, by filling a tight and unyielding chamber full of the said material and then passing the water through the same, whereby the expansion of the grains is utilized to close the interstices between the same and compel the water to pass through the pores, the pressure also preventing the grains from rising up in the water-chamber, substantially as described.

JONATHAN MILLER.

Witnesses:
EDWARD WILHELM,
JOHN J. BONNER.